United States Patent

[11] 3,556,259

| [72] | Inventor | Earle F. Allen |
| | | Norwell, Mass. |
| [21] | Appl. No. | 807,063 |
| [22] | Filed | Mar. 13, 1969 |
| [45] | Patented | Jan. 19, 1971 |
| [73] | Assignee | Valentine E. Macy, Jr. |
| | | New York, N.Y. |
| | | a part interest |

[54] FAIL-SAFE BRAKE WITH ELASTOMERIC ACTUATOR
11 Claims, 11 Drawing Figs.

[52] U.S. Cl............................................. 188/67,
188/170; 248/355
[51] Int. Cl.................................................... B65h 59/10
[50] Field of Search........................................ 188/67,
136, 170, 152.86A, 166; 248/354, 355; 254/31,
106; 92/27, 28

[56] References Cited
UNITED STATES PATENTS

| 2,359,516 | 10/1944 | Frank | 188/152.86(A) |
| 2,390,168 | 12/1945 | Piot | 188/67UX |
| 2,845,902 | 8/1958 | Anderson | 188/67UX |
| 3,203,513 | 8/1965 | Allen | 188/67X |

FOREIGN PATENTS

| 970,848 | 6/1950 | France | 74/531 |

OTHER REFERENCES
IBM Technical Disclosure Bulletin, Vol. 4, No. 8, January 1962.

*Primary Examiner*—George E. A. Halvosa
*Attorney*—Norman N. Holland

ABSTRACT: An improved fail-safe type of brake is disclosed for engaging rodlike pistons or other driven members for locking them against movement. The brake has a brakeshoe surrounding the rod with an inner friction surface for engaging the rod. The brakeshoe is formed in a number of sections and has its outer surface spaced from an outer housing. The space between the shoe and housing is filled with a compressed resilient elastomer which is attached to the facing surfaces of the brakeshoe and the housing. The compressed elastomer applies a radially inwardly directed braking force on the rod. Relative axial movement between the brakeshoe and the housing by a hydraulic drive in the brake results in a deformation or thinning of the elastomer and the release of the braking force. When the hydraulic drive in the brake is released, the resiliency of the elastomer returns it to its original compressed braking form. The braking force is thus obtained from the compressed elastomer and the deformation of the elastomer by the application of a hydraulic force releases the brake.

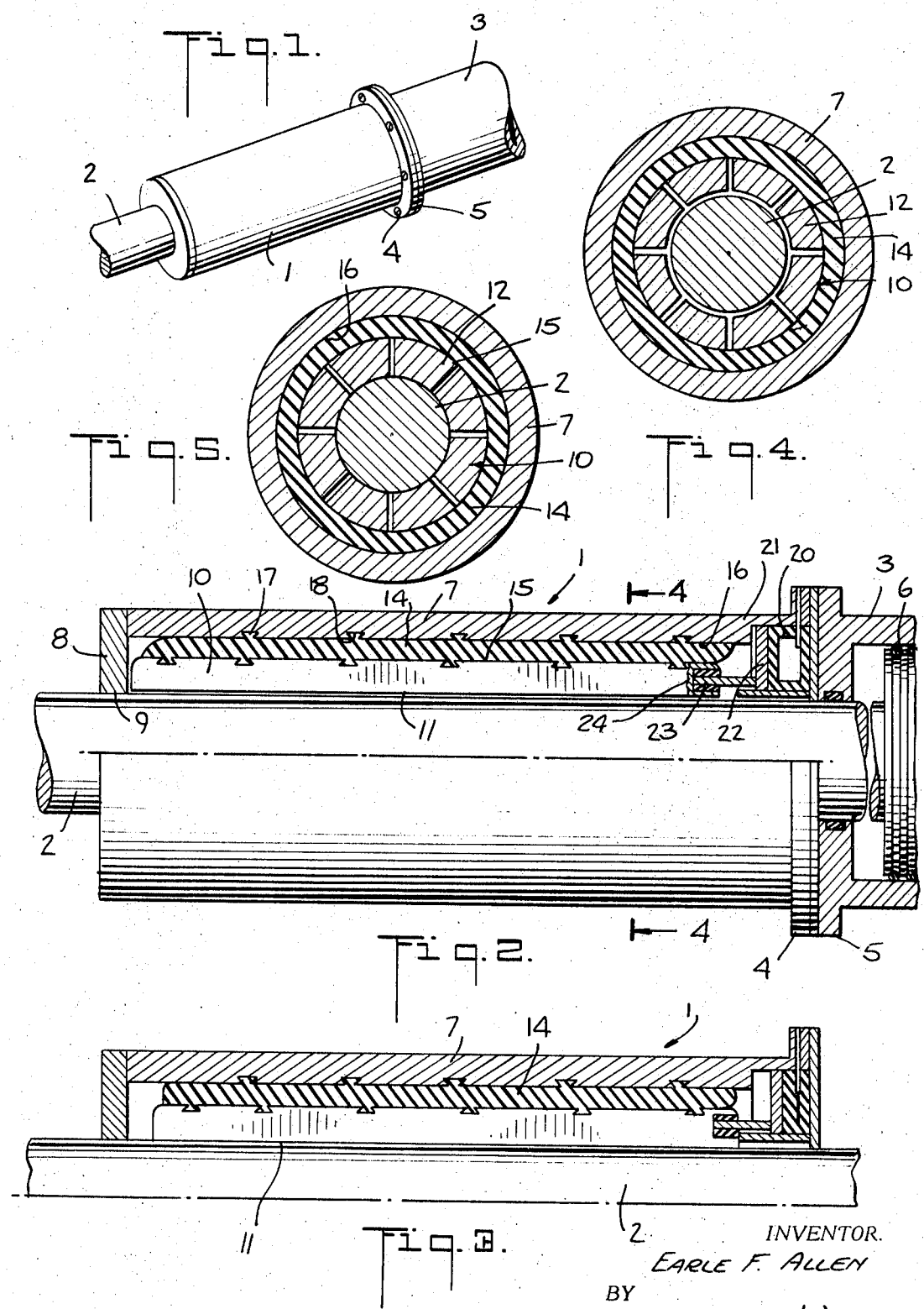

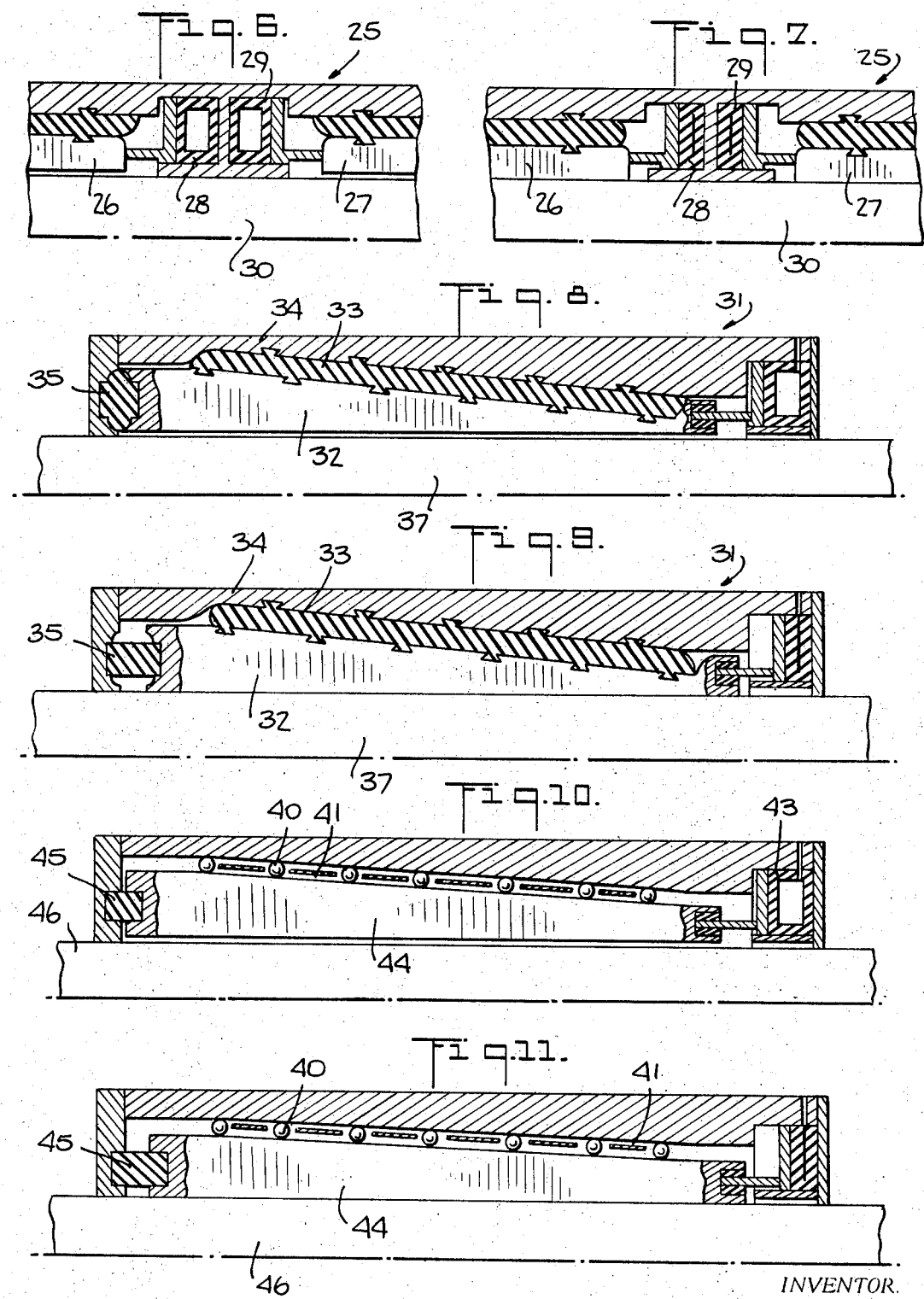

FAIL-SAFE BRAKE WITH ELASTOMERIC ACTUATOR

BACKGROUND OF THE INVENTION

A wide range of powered systems utilize hydraulic drive cylinders for performing a lifting or other controlled powered operation. In many such uses of hydraulic drive motors of this type, it is essential that absolute control be maintained over the driven object at all times. In particular, it has been found essential to have a reliable braking means for maintaining the drive position in the event of a failure of the hydraulic drive pressure.

In order to provide for such a control of the hydraulic drive, a variety of fail-safe brakes have been provided such as described, for example, in my issued U.S. Pat. Nos. 3,203,513 and 3,276,059 dated Aug. 31, 1965 and Oct. 4, 1966, respectively. In general, these fail-safe brakes operate on a principle whereby they are released by hydraulic pressure which may be obtained from the same source which is operating the drive motor. The braking force is obtained by integral resilient members such as steel springs or various arrangements of elastomers. The brake of the present invention represents a further improvement upon fail-safe brakes wherein the brake applying member is an elastomer and whereby an extremely great braking force is obtained from a radial compression of the elastomer and the brake release is obtained by using an axial deformation of the elastomer. Such brakes eliminate the need for steel springs with their related corrosion problems and they also provide extremely high braking forces with elastomeric springs of relatively small size and excellent durability.

Accordingly, an object of the present invention is to provide an improved fail-safe brake including an elastomeric brake application member.

Another object of the present invention is to provide a fail-safe brake for elongated rodlike members which is extremely compact and corrosion resistant.

Another object of the present invention is to provide a fail-safe brake having an elastomeric means for applying the brake and which has extremely long life and high reliability.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification wherein:

FIG. 1 is a perspective view illustrating a preferred embodiment of the brake in accordance with the invention as mounted on a typical hydraulic drive piston;

FIG. 2 is an enlarged side elevational view partially in section illustrating a preferred embodiment of the elastomeric brake in its released condition;

FIG. 3 is a side elevational view partially in section similar to FIG. 2 illustrating the brake in its applied condition;

FIGS. 4 and 5 are vertical sectional views of the brakes taken along lines 4—4 and 5—5 on FIGS. 2 and 3 respectively;

FIGS. 6 and 7 are side elevational views partially in section illustrating a pair of similar brakes mounted in end to end relation for tandem operation on a double acting drive rod;

FIGS. 8 and 9 are side elevational views partially in section illustrating another embodiment of the brake having the brakeshoe and housing members with complementary tapered surfaces; and FIGS. 10 and 11 are side elevational views partially in section of an additional embodiment utilizing a tapered brakeshoe and housing.

DESCRIPTION OF THE PREFERRED EMBODIMENT

The brakes as described herein are principally adapted for use in locking or braking rodlike members against movement. They, therefore, have an important application when utilized with the drive rods of hydraulic drive cylinders. Hydraulic drive cylinders have a wide application on a variety of movable structures due to the high power which they exert in a smooth efficient drive action and also due to their reliability and relatively compact size. There are, however, an important number of applications for hydraulic drive cylinders where it is desirable that an effective piston rod braking or locking action be provided to hold the piston rods stationary at any position and also to provide an effective locking or braking action in the event that there is a failure of the drive cylinder due to the loss of hydraulic pressure in the hydraulic drive system.

Brakes of this type must provide an effective locking action on the relatively smooth drive rods and they should also have a fail-safe operation whereby they are automatically applied upon a significant reduction of the hydraulic system pressure.

FIGS. 1 through 5 illustrate an improved fail-safe brake for locking or braking hydraulic piston rods where the principal actuating member is an elastomeric member.

FIG. 1 is a perspective view showing a typical outside configuration for an elastomeric brake 1 in accordance with the present invention mounted to surround a movable hydraulic cylinder drive rod 2 which is driven by an associated hydraulic piston 3. As seen in this figure, the brake 1 may be conveniently mounted immediately adjacent to one end of the hydraulic drive cylinder 3 as, for example, by having adjacent flanges 4 on the brake 1 and 5 on the drive cylinder 3 bolted or otherwise coupled together.

FIGS. 2 and 3 illustrate a preferred embodiment of the brake in its off and on conditions, respectively.

The hydraulic drive cylinder 3 shown at the right side of FIG. 2 includes a drive piston 6 which is coupled to the drive rod 2 for axial reciprocating movement of the rod 2. The brake 1 is shown mounted coaxially with rod 2 having the end flange 4 of the brake housing 7 coupled to end flange 5 of the drive cylinder 3. The brake 1 illustrated in FIGS. 2 and 3 is designed for locking the rod 2 against movement where the principal force on the locked rod is acting from left to right or towards the hydraulic drive cylinder 3.

The preferred embodiment of the brake 1 comprises the hollow outer housing 7 with a suitable circular end piece 8 having a circular aperture 9 surrounding the piston rod 2. A brakeshoe 10 of hollow cylindrical form is positioned within the housing 7 and surrounds the piston rod 2 having arcuately shaped inner rod engaging surfaces 11. As best illustrated in FIG. 4, the shoe 10 is formed with a plurality of individual sections 12 to permit radial movement of these sections 12 toward and away from the piston rod 2 during the braking action.

The cylindrical elastomeric braking member 14 is shown occupying the cylindrical space between the outer surface 15 of the brakeshoe 10 and the cylindrical inner surface 16 of the brake housing 7. This elastomeric member 14 is preferably formed of an elastomer which may be injection molded in the indicated zone and which is bonded to the brake and housing surfaces 15 and 16 by the molding pressure and is additionally locked thereto by means of the several spaced keys 17 filling the detents 18 provided on the brake and housing surfaces. One particularly suitable elastic material is polyurethane elastomer although a variety of natural and synthetic rubber formulations are suitable where they have resilient properties together with a high degree of memory or ability to resume their original molded form after being deformed for relatively long periods.

The elastomeric member 14 is illustrated in FIG. 3 in its axially unstressed condition where it is provided with a radial thickness sufficiently great to force the inner brake segments 12 against the piston rod 2. When the brake 1 is assembled on the piston rod 2, an axially directed force is applied to one end of the several brakeshoe sections 12 so that the inner portion of the elastomeric member is moved axially with respect to the outer portion and so that a substantial reduction of the elastomeric member 14 thickness results. The application of this force permits the assembly or positioning of the brake 1 on the piston rod 2 and also provides for the off or released position of the brake since the brakeshoe 10 is then held in a radially spaced position from the rod 2.

In the embodiment illustrated in FIGS. 1 through 5, this axial brakeshoe movement is provided by a hydraulic drive means consisting of the hollow circular or donut-shaped bladder 20 positioned between the brake end 21 and a ringlike sealing plate 22. The bladder 20 is coupled to the brakeshoe 10 by means of a cylindrical drive member 23 extending axially of the piston rod 2 and having a means at its outer end such as an elastomeric coupling 24 to permit the above described radial movement of the brakeshoe sections 12 during brake application and release. FIG. 2 shows the bladder 20 coupled to a source of hydraulic pressure so that it is in its expanded condition and so that the drive member 23 and its interconnected brakeshoe sections 12 are moved to to the left. This movement of the brakeshoe sections 12 has applied shearing stresses to the elastomeric brake member 14 and corresponding longitudinal strain in the member and which reduces its thickness and which lifts the brakeshoe sections 12 clear of the piston rod 2. FIG. 4 is a sectional view showing the several brakeshoe sections 12 moved away from the rod 2 in this manner. FIGS. 3 and 5 show the condition of the several brakeshoe sections 12 when the hydraulic pressure has been removed from the bladder 20 so that the bladder 20 has collapsed under the force of the recovery stresses within the elastomer 14. The elastomeric braking member 14 in these figures has tended to resume its original molded form as far as possible and in doing this it has thickened and forced the several brakeshoe sections 12 against the piston rod 2 with an extremely great pressure which provides a high overall braking force between the surfaces of the brakeshoes and the cylindrical surfaces of the drive piston rod 2.

It is, therefore, seen that the releasing of the brake 1 is accomplished when hydraulic pressure is available and is applied to the bladder 20. In a fail-safe braking system this bladder 20 may be operated directly from the hydraulic pressure system which is operating the main drive cylinder. This means that when hydraulic pressure is applied to the drive cylinder it will be simultaneously applied to the bladder 20 to release the brake 1. When the hydraulic drive pressure is cut off either intentionally by the operator or by an unexpected failure of the system, the brake 1 will automatically be applied by the energy stored in the deformed elastomeric member 14. This automatic operation will prevent any movement of the piston rod 2 to assure safe operation of the related drive system utilizing the brake. It is seen from the above description that all of the critical members of the brake may be formed of either steel or of the elastomer and that the elastomeric element is inherently waterproof and resistant to water damage so that the brake itself may be fully submerged in water and will remain operative as well as resistant to any deterioration due to such submersion.

While the brake of FIGS. 1 through 5 provides its principal braking action where the load acts on the piston rod from left to right in FIG. 2, it does provide a significant braking action in the opposite direction. Where, however, the locked or braked rod may be subjected to substantial loads from either direction a double arrangement of the brakes made back to back is preferable so that one or the other of the brakes will tend to be forced more tightly into its braked position regardless of the direction of the forces applied to the locked piston rod. Fig. 6 illustrates a double brake 25 with the brakeshoes 26, 27 extending in opposite directions from a central hydraulic bladder arrangement 28, 29. Where the left-hand bladder 28 is expanded to release the left-hand brakeshoe 26 and where the right-hand bladder 29 is expanded in the opposite direction to release the right-hand brakeshoe 27. FIG. 7 illustrates the bladders 28 and 29 in their collapsed condition with the hydraulic pressure removed and with the brakeshoes 26 and 27 both engaging the piston rod 30. The left-hand brakeshoe 26 will be effective against rod movement to the right which tends to move the left-hand brakeshoe more tightly against the rod 30 while the opposite or right-hand shoe 27 will tend to resist the opposite motion of the drive rod 30 to the left for a similar reason.

FIGS. 8 and 9 illustrate an elastomeric brake 31 having the same basic elements as already described for FIGS. 1 through 5 including inner brakeshoes 32 coupled by an elastomeric braking member 33 to an outer housing 34. In this case, the facing surfaces of the brakeshoes and the housing have a complementary tapered form as illustrated so that the braking action of the elastomeric member 33 is reinforced by wedge action which results as the brakeshoes are moved to the right when the bladder collapses upon a release of hydraulic cylinder driving pressure.

FIG. 9 illustrates this embodiment of the brake in its braking position where the stored energy in the elastomeric braking member has fully collapsed the bladder and has tightly forced the braking shoes against the piston rod. FIGS. 8 and 9 illustrate an auxiliary elastomeric ring member 35 which is inserted in compressed condition between the brakeshoes and the brake endpiece. This member is highly compressed when the brake is released and this stored energy assists in the application of the brakeshoes 36 by assisting to force them against the piston rod 37 upon release of hydraulic pressure within the braking bladder. This auxiliary elastomeric drive member is not required for relatively low braking forces where the stored energy in the main elastomeric braking member is sufficient.

FIGS. 10 and 11 illustrate a further embodiment of a fail-safe elastomeric actuating brake where the cylindrical elastomeric braking member 33 is eliminated and where the space between the brakeshoes and the brake housing is occupied by ball bearings 40 held in position by a suitable hollow cage member 41. This brake 42 is similarly released by the injection of hydraulic fluid into the braking bladder 43 to move the brakeshoe 44 to the left and the brake is applied upon a release of the hydraulic pressure by the energy stored in the elastomeric end member 45 which forces the brakeshoe 44 in a wedge action against the piston rod 46.

It will be seen that an improved fail-safe brake has been provided which is particularly adapted for use with driven rod members as, for example, hydraulic cylinder piston rods. A fail-safe brake of this type has been provided having a compact form which is obtained by the use of an elastomeric brake actuating member which in its preferred form is positioned between and attached to the brakeshoes and an outer brake housing. Such elastomeric actuating members have been found to provide relatively small yet effective energy storing members which are particularly suited for this use and which in addition are corrosion proof and permit brake operation in underwater locations without the necessity of elaborate and expensive water seals.

The improved elastomeric brake is also relatively simple in the form and easy to manufacture so that is adapts itself to high volume use in a variety of sizes and embodiments.

As changes may be made in the construction and arrangements of the parts herein without departing from the spirit and scope of the invention and without sacrificing any of its advantages, it is to be understood that all matter herein is to be interpreted as illustrative and not in a limiting sense.

I claim:

1. A brake for an elongated, axially movable rod comprising:
   a brakeshoe surrounding the rod and being mounted for movement radially of the rod;
   a hollow housing member spaced outwardly from and surrounding the brakeshoe;
   an elastomeric braking member mounted coaxial to the outer surface of the brakeshoe, said braking member being made of material selected from the group consisting of natural rubber, synthetic rubber and plastic and being positioned between and compressed by the inner wall of the housing member and the outer surface of the brakeshoe whereby it presses the brakeshoe against the rod; and drive means for stretching the braking member axially of the rod whereby it is deformed and has a reduced thickness radially of the rod to remove the pressure of the brakeshoe from the rod.

2. A brake for an axially movable cylindrical rod comprising the combination of:

a generally cylindrical brakeshoe surrounding said rod and having axial slot means for permitting the shoe to be forced radially inwardly in gripping engagement with the rod;

a hollow member having a generally cylindrical surface spaced radially outwardly from and surrounding said brakeshoe;

an elongated hollow generally cylindrical elastomeric braking member made of material selected from the group consisting of natural rubber, synthetic rubber and plastic positioned between and compressed by and attached to facing outer and inner surfaces of said brakeshoe and said hollow member respectively; and hydraulic power means for stretching said braking member by relatively moving the brakeshoe and hollow member axially and thereby reducing the radial thickness of the braking member and releasing its compressive force on the brakeshoe.

3. The brake as claimed in claim 2 in which said hydraulic power means comprises a hydraulically driven pistonlike member, and means coupling said brakeshoe to said pistonlike member including means permitting axial and radial movement of said brakeshoe.

4. A brakeshoe for an axially movable rod comprising the combination of:

a brakeshoe surrounding said rod;

a hollow member spaced outwardly from and surrounding said brakeshoe;

an elastomeric braking member made of material selected from the group consisting of natural rubber, synthetic rubber and plastic positioned between, secured to and compressed by said brakeshoe and said hollow member and normally pressing said shoe radially into braking engagement with said rod; and power means for stretching said braking member by relatively moving the brakeshoe and the hollow member axially in one direction and thereby reducing the radial thickness of the braking member and releasing its radially inward force on the brakeshoe.

5. The brake as claimed in claim 4 in which said brakeshoe and said hollow member have facing surfaces flared with respect to the axis of said rod.

6. The brake as claimed in claim 4 in which said power means comprises a hydraulically operated means.

7. The brake as claimed in claim 4 in which said power means comprises an expandable bladder adapted for connection to a source of fluid under pressure.

8. The brake as claimed in claim 4 in which said brakeshoe and said hollow member have cylindrical outer and inner facing surfaces respectively and said elastomeric braking member comprises a hollow cylinder.

9. The brake as claimed in claim 4 in which said securement between said elastomeric braking member and said brakeshoe and hollow member comprises physically interlocked portions.

10. The brake as claimed in claim 4 in which said brakeshoe has a flared outer surface and the inner surface of said hollow member has a complementary flared shape, and said elastomeric braking member is a hollow truncated cone.

11. The brake as claimed in claim 4 which further comprises a second brakeshoe and a second elastomeric braking member positioned for providing relative axial movement between said second brakeshoe and said hollow member, and additional power means for stretching said second braking member by relatively moving the second brakeshoe and hollow member axially in the opposite direction.